United States Patent
Sekiguchi et al.

(10) Patent No.: US 7,335,095 B2
(45) Date of Patent: Feb. 26, 2008

(54) APPARATUS AND METHOD FOR SEPARATING WINGS FROM BREAST MEAT OF POULTRY

(75) Inventors: Mitsuaki Sekiguchi, Koto-ku (JP); Shouji Igawa, Koto-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 0 days.

(21) Appl. No.: 11/537,647

(22) Filed: Sep. 30, 2006

(65) Prior Publication Data

US 2007/0072530 A1   Mar. 29, 2007

Related U.S. Application Data

(63) Continuation of application No. PCT/JP2005/005804, filed on Mar. 29, 2005.

(30) Foreign Application Priority Data

Mar. 31, 2004   (WO) .............. PCT/JP2004/004686

(51) Int. Cl.
*A22C 21/00* (2006.01)
(52) U.S. Cl. .................................. 452/169
(58) Field of Classification Search ............ 452/82–85, 452/94, 95, 125, 129, 130, 149, 153–155, 452/166–169, 170, 187–189
See application file for complete search history.

(56) References Cited

U.S. PATENT DOCUMENTS

| | | | | |
|---|---|---|---|---|
| 4,610,051 A | * | 9/1986 | Martin et al. ............. | 452/130 |
| 4,723,339 A | * | 2/1988 | van de Nieuwelaar et al. ................. | 452/130 |
| 4,935,990 A | * | 6/1990 | Linnenbank ............. | 452/167 |
| 4,993,111 A | * | 2/1991 | Martin et al. ............. | 452/169 |
| 5,098,336 A | * | 3/1992 | DeLong ................... | 452/130 |
| 5,147,240 A | * | 9/1992 | Hazenbroek et al. ..... | 452/165 |
| 5,336,127 A | * | 8/1994 | Hazenbroek ............. | 452/160 |
| 5,472,377 A | * | 12/1995 | Andrews et al. .......... | 452/149 |
| 5,733,184 A | * | 3/1998 | Curry et al. .............. | 452/138 |
| 6,004,199 A | * | 12/1999 | Habenicht et al. ........ | 452/166 |
| 6,007,416 A | * | 12/1999 | Janssen et al. ........... | 452/135 |
| 6,277,020 B1 | * | 8/2001 | Stephens .................. | 452/135 |

FOREIGN PATENT DOCUMENTS

| | | |
|---|---|---|
| JP | 2-027938 A | 1/1990 |
| JP | 4-211322 A | 8/1992 |

(Continued)

OTHER PUBLICATIONS

Relevant portion of International Search Report of corresponding PCT Application PCT/JP2005/005804.

*Primary Examiner*—Thomas Price
(74) *Attorney, Agent, or Firm*—Rossi, Kimms & McDowell LLP

(57) ABSTRACT

A wing separation apparatus and method for separating wings from a breast part of poultry having its breast bone removed can handle a wide variety of poultry sizes. The breast part is supported at its left and right arm pits on a pair of shafts with the left and right arm pits positioned substantially perpendicular to the shafts. Left and right guides positioned adjacent to the shafts position the tendons at the arm pits for cutting. The guides maintain the posture of the wings and gradually applies pressure against the breast meat to position the tendons for cutting. Left and right rotary blades disposed adjacent to the guides cut the tendon near the guides, thereby separating the wings from the breast meat.

21 Claims, 10 Drawing Sheets

FOREIGN PATENT DOCUMENTS

| | | |
|---|---|---|
| JP | 5-13180 U | 2/1993 |
| JP | 5-023100 A | 2/1993 |
| JP | 10-066504 A | 3/1998 |
| JP | 10-229811 A | 9/1998 |

\* cited by examiner

20: Inlet Unit
21: Work Fixing Unit
22a: Ridge Cut Unit
22b: Shoulder Cut Unit
23: Shoulder Tendon Cutting Unit
24: Breast Meat Separation Unit
25: Breast Tender Incision Making Unit
26a: Breast Tender Separation Unit
26b: Breast Tender Muscle Cutting Unit
27: Bone Outlet Unit

APPARATUS AND METHOD FOR SEPARATING WINGS FROM BREAST MEAT OF POULTRY

This is a continuation of International Application PCT/JP2005/005804 (published as WO 2005/094596) having an international filing date of 29 Mar. 2005, which claims priority to International Application PCT/JP2004/004686 (published as WO 2005/099463) having an international filing date of 31 Mar. 2004. The disclosure of the priority application, in its entirety, including the drawings, claims, and the specification thereof, is incorporated herein by reference.

BACKGROUND

Poultry wings, chicken wings in particular, are typically used for making a lesser grade food such as soup, buffalo wings and so on, while the breast meat is typically used for making a higher grade food such as fried cutlet, salad, sandwich, and so on. There are many uses for different parts of the poultry. For instance, chicken wings are sold separately from the breast meat. Typically, the breast meat is sold at a much higher price than the wings. Accordingly, as disclosed in JP 02-27938A, the left and right wings are cut from the upper body of the poultry in a manner to obtain the maximum quantity of breast meat.

The above-mentioned reference is explained referring to FIGS. 10, 11A, and 11B, where FIG. 10 is a detailed perspective view of a cutting apparatus for cutting the left and right wings from the breast meat, while FIGS. 11A and 11B are enlarged views of the rotary cutting unit. FIG. 11A is a side view taken along the shafts and FIG. 11B is an end view taken along the shafts. Two pairs of screw or helical shafts 101a, 101b, each pair supporting a lower portion of the shoulder joint of the left or right wing 1B, are disposed at the left and right sides along a horizontal plane. Each pair of shafts 101a, 101b rotate in opposite directions. Further, helical grooves 103 extend along the shafts 101a, 101b. At the upper plane and toward the down stream of the shafts 101a, 101b, left and right disc rotary blades 102, 102 are rotatably driven about the rotation shafts 102b, 102b and disposed so that they can move away from the work cutting position, i.e., along the opposite direction and moreover along the outer circumferential direction.

Next, the operation of the above-mentioned reference follows. First, by using a conveyer (not shown) and gambrel (not shown), the wings 1B of the breast part 1 are directed upward along a direction vertical to the shafts 101a, 101b, and moreover in the horizontal plane at the left and right sides. The wings 1B are introduced into a pair of left and right shafts 101a, 101b. Thus, the knuckle portion or shoulder joint 10 at the root of each wing 1B is placed between one of the pairs of shafts 101a, 101b. The breast meat 1A, which is stretched vertically, is moved toward the rotary blades by rotating the shafts 101a, 101b along the directions indicated by the arrows as shown in FIG. 10.

Because the left and right wings 1B themselves are not supported, they can freely rotate in relation to the breast meat 1A. Accordingly, as the rotary blades 102, 102 cut the lower sides of the shoulder joints 10, the left and right wings can move from the back sides to the breast sides as the are being separated from the breast meat 1A. Further, because the lower portions of the shoulder joints 10 are wedged between the helical grooves 103, the rotary blades 102, 102 cut the wings 1B above the joints 10, namely at the upper edges of the grooves 104, 104. Accordingly, the skin on the surface of the breast meat escapes between the rotary blades 102, 102 and the groove 103 (between the adjacent landings 104 on the shaft 101a, 101b). In other words, if the rotary blades 102, 102 become dull, the wings 1B can be imperfectly separated from the breast meat 1A.

Further, as shown in FIGS. 11A and 11B, the lower sides of the shoulder joints 10 of the roots of the wings 1B are moved toward the rotary blades 102, which are positioned over the upper edges of the groove 103. Accordingly, the rotary blades are not accurately inserted into the joint tissue (tendon) of the shoulder joints 10, thereby erroneously cutting the bones 10b of the roots of the wings 1B of the upper ends of the shoulder joints 10. In particular, the breast part 1 is moved using the rotation of the helical threadings of two pairs of shafts 101a, 101b, which apply downward forces on the shoulder joints 10. Accordingly, the roots of the wings 1B of the shoulder joints can be easily pulled into the helical grooves 103 and the large radius joint bone portions 10b can be easily pulled into the helical grooves 103, thereby not only crushing the joint bone portions 10b by the pressures from the shafts 101a, 101b, but also cutting the breast meat at the uppermost joint bone portions 10b of the roots of the wings 1B rather than at the tendons of the joints so that the quality of the resulting breast meat is not as desirable.

Further, if the shafts 101a, 101b are spaced at a fixed distance, the processing range of the poultry sizes (namely due to different joint sizes) is narrow. Accordingly, the distance between the shafts 101a, 101b needs to be finely adjusted to avoid the above-mentioned pulling-in of the joint bone portion 10b into the shafts 101a, 101b, complicating the operation of the apparatus.

The present inventors disclosed in JP 10-66504A an apparatus for automatically processing poultry. Nonetheless, there still remains a need for an apparatus/method for separating wings with a wide tolerance of the poultry sizes, while accurately cutting the joint tissue (tendon) of the shoulder joints 10.

SUMMARY OF THE INVENTION

The present invention relates to an apparatus and a method for separating wings from a breast part of poultry, which can have the breast bone already removed.

One aspect of the present invention is an apparatus for separating left and right wings from the breast part. The apparatus can include left and right shafts, first guides, and rotary blades. The left and right shafts, which can have helical threadings, can support the breast part from its left and right arm pits, with the left and right wings positioned substantially aligned perpendicular to a moving direction of the breast part, which is moved by rotating the shafts. The left and right first guides can extend along and above the shafts for positioning left and right tendons (joint tissues) at the arm pits for cutting. The left and right rotary blades can be disposed adjacent to the outer sides of the guides. The breast part can be moved toward the rotary blades by rotating the shafts. The rotary blades cut the tendons to separate the wings from a breast meat thereof as the breast part is conveyed by the shafts toward the blades.

The guides can be positioned spaced from the shafts with the spacing therebetween gradually becoming narrower along the moving direction of the breast part. The entire guides, or portions of the guides at least at a position adjacent to the rotary blades, can be slanted toward an inner center between the shafts. The outer side of each of the guides can have a recess for receiving the respective rotary blade. The rotary blades can be disposed parallel to the respective outer side of the guides.

The apparatus can further include left and right second guides disposed substantially parallel to and laterally outwardly of the shafts. Portions of the second guides can be bent toward outer sides adjacent to the blades to avoid interference with the rotary blades.

The apparatus can further include a pushing force device for pushing the breast meat toward the shafts immediately upstream of the rotary blades. The pushing force device can include left and right rotating support arms rotatively mounted respectively to the left and right guides, left and right pressure applying devices, which can be weights or springs, disposed respectively on the left and right support arms for applying pressure to the left and right rotating support arms, and left and right breast meat pressing members, which can be rollers, mounted to the left and right rotating support arms for pressing the breast meat.

The apparatus can further include a delivering apparatus for delivering the breast part onto the shafts. The delivering apparatus can include left and right guide frames having left and right guide openings for receiving and guiding the breast part toward the shafts, and a pushing device for pushing the breast part toward and onto the shafts. Each of the guide openings can include a linear guide route and an arcuate guide route extending downstream from the linear guide route. A stop can be formed between the linear guide route and the arcuate guide route for stopping the breast part. The pushing device can include a pushing arm for pushing the breast part along the linear guide route to the stop and left and right rotating arms for pushing the breast part located at the stop through the arcuate guide route and onto the shafts.

Another aspect of the present invention is a method of separating the left and right wings from the breast part of poultry. The method can include supporting the breast part from its left and right arm pits on the left and right shafts, with the left and right wings positioned substantially aligned perpendicular to the moving direction of the breast part, which is moved by rotating the shafts. The method can also include positioning the left and right tendons at the arm pits for cutting with the left and right first guides extending along and above the shafts. The method can include moving the breast part with the wings along the shafts toward left and right rotary blades disposed adjacent to the guides by rotating the shafts. The method can include cutting the tendons with the rotary blades while the breast part is moved along the shafts to separate the wings from a breast meat thereof.

The tendons can be positioned for cutting by pushing the guides toward the tendons. The breast meat can be pushed with a pushing force device to apply pushing forces toward the shafts immediately upstream of the rotary blades. The pushing forces can be generated by gravity forces that allows fluctuation upwardly away from or downwardly toward upper surfaces of the shafts, which can have helical grooves.

The method can further include grasping the breast part with the wings spread out from the breast meat with a grasping apparatus, delivering the breast part to the delivering apparatus while the breast part is grasped by the grasping apparatus, and introducing the breast part onto the shafts with the delivering apparatus.

DETAILED DESCRIPTION

Figure 1:
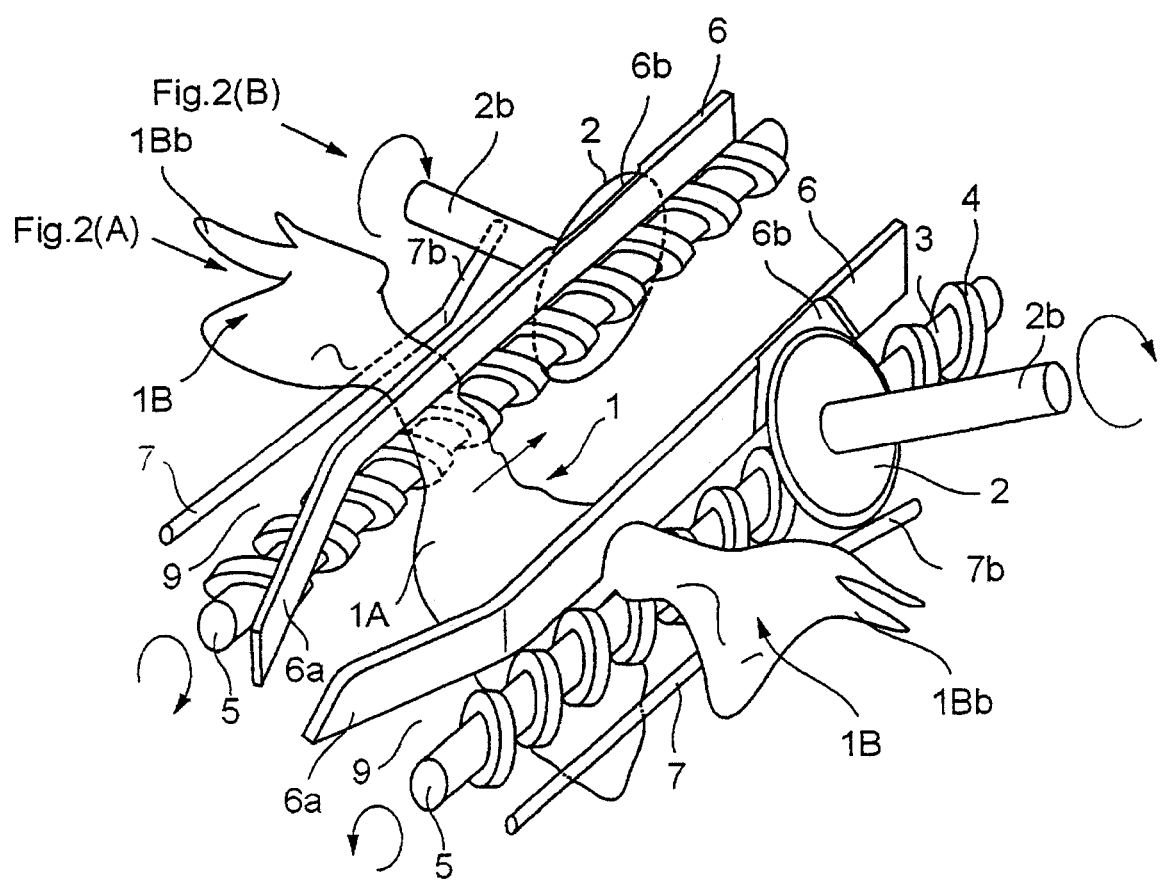
FIG. 1 illustrates a perspective view of a first embodiment of an apparatus for separating left and right wings from the breast part of poultry according to the present invention.
Figure 2A:
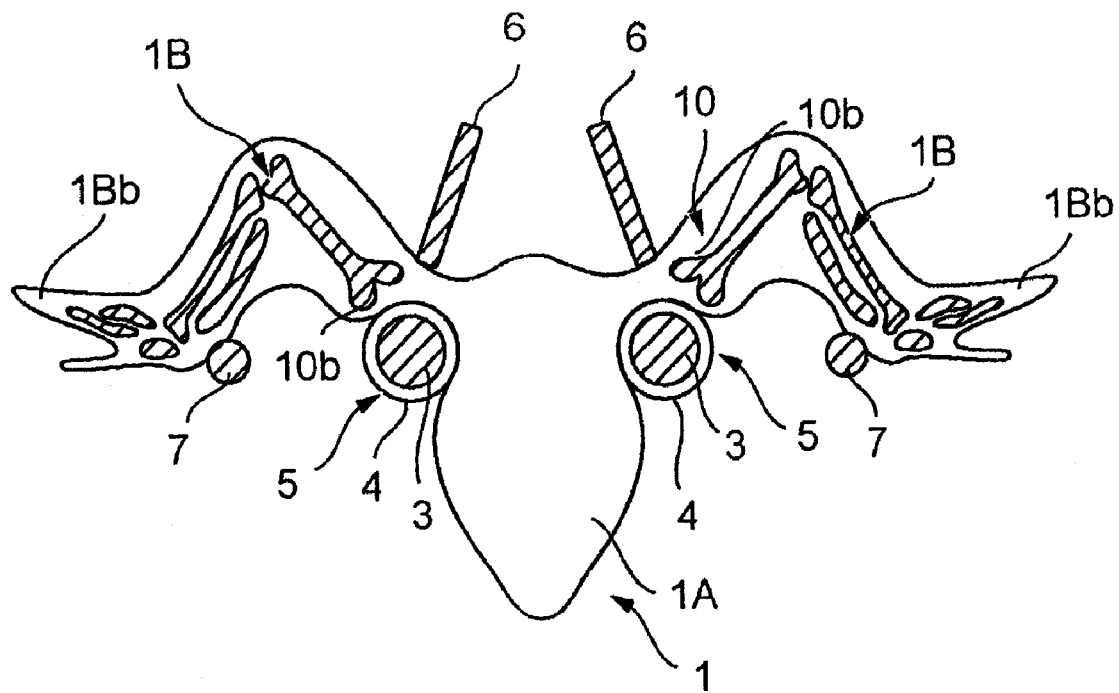
FIG. 2A illustrates a cross-sectional view at the upstream of the rotary blade of FIG. 1.
Figure 2B:
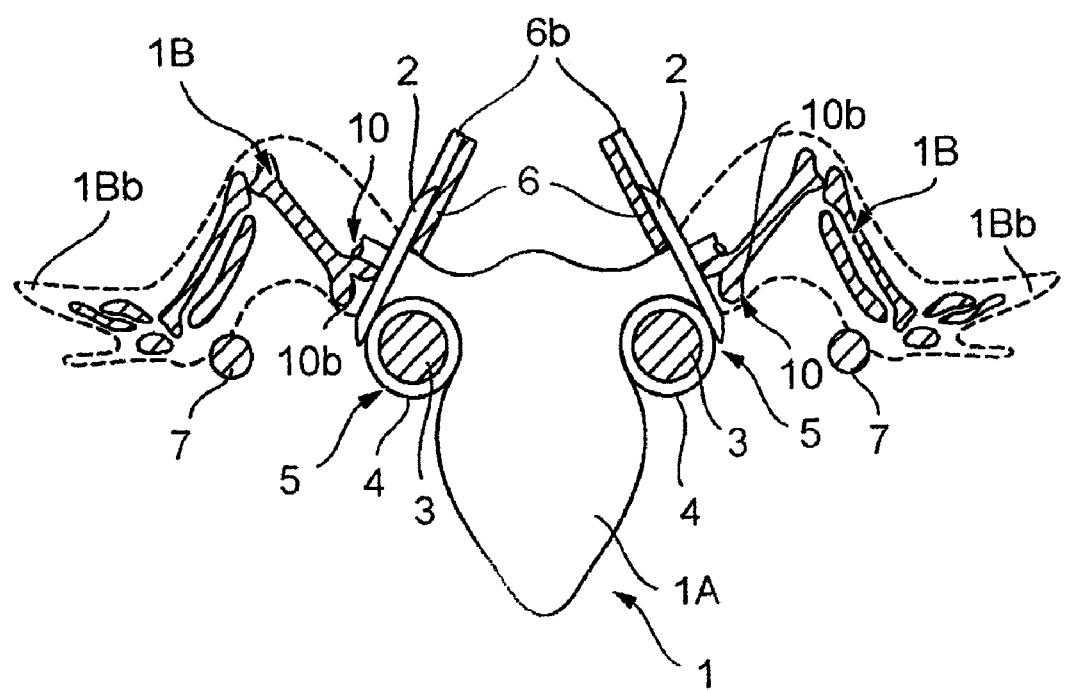
FIG. 2B illustrates a cross-sectional view at the position of the rotary blade of FIG. 1.

Referring to FIGS. 1-2, the first embodiment of an apparatus for separating wings of poultry, such as chicken, from the breast meat includes a pair (left and right) of shafts 5, 5 spaced apart and parallel substantially along a horizontal plane. The shafts 5, 5, which are rotatable in opposite directions, each have a helical thread that forms grooves 3 and lands 4 for moving the breast part, with its attached wings suspended between the shafts at two points. The apparatus also includes left and right rotary blades 2, 2 to which the breast part is moved toward as the shafts are rotated in opposite directions. Left and right guides 6, 6 are provided symmetrically (mirror image) above the shafts 5, 5 and at an inner upward oblique space of the shafts 5, 5.

The guides 6, 6 have opposing left and right inlet guides 6a, 6a that are bent toward each other, namely toward midway between the two spaced shafts 5, 5, thereby providing left and right guide spaces 9, 9 where joint tissue of the roots of the left and right wings 1B (the tendon positioned at the breast meat) can be inserted. Left and right recesses 6b, 6b are formed on the outer side of the guides 6, 6 at the position of the rotary blades 2, 2 so that the rotary blades 2, 2 can intrude into the recesses 6b, 6b. The blades 2, 2 are connected to their respective shafts 2b, 2b.

The guides 6, 6 can be slanted or angled inwardly relatively toward a vertical plane along their entire length, or only at the positions of the rotary blades 2, 2. In other words, the lower part of the guides 6, 6 extend outwardly more than the upper part thereof, and the angle of slant gradually increases toward the downstream so that the gap between the lower portion of the guides and the respective shafts narrows toward the downstream. Moreover, the guides 6, 6 can be slanted only at the position of the rotary blades 2, 2, slightly inwardly in relation to a plane vertical from the rotating axes of the shafts 5, 5. Specifically, as clearly illustrated in FIGS. 2A and 2B, the guides 6, 6 can be slanted slightly more toward the rotary blades. That is, the guides 6, 6 can be slanted, as if they were to intersect at the upper space of the downstream end of the shaft where they are slanted more gradually. The guides 6, 6 also can be gradually slanted more toward the downstream side of the shafts 5, 5. The guides 6, 6 can have a flat board configuration. The rotary blades 2, 2 can be slanted inwardly from the vertical direction, parallel to the guides 6, 6 so that the blades 2, 2 are set close to the recesses 6b, 6b.

Another left and right guides 7, 7, which can have a bar configuration, can be disposed parallel to the shafts 5, 5 at the outer lateral sides of the shafts 5, 5. Further, the bar guides 7, 7 each can have an outwardly bent portion 7b under the respective rotary blade 2 to avoid interference therewith.

The distance between the shafts 5, 5 is set so that the shoulder joint tissue (where the bones of the breast meat 1A of the breast portion 1 with the wings are removed) can be suspended or supported at two points. The distance between the guides 7, 7 is such that the wing tips 1Bb, 1Bb of the breast part with the wings supported by the shafts 5, 5 can be pushed upwardly and in a spread out fashion. The distance between the lower end of the guides 6, 6 and the respective shafts 5, 5 is such that the tendon of the breast meat 1A at the slightly inner portion of the shoulder joint from which the bone of the breast meat 1A is removed is intensely pressed. In this respect, gradually slanting the guides 6, 6 more toward the downstream side can applying the pressure.

Figure 3:
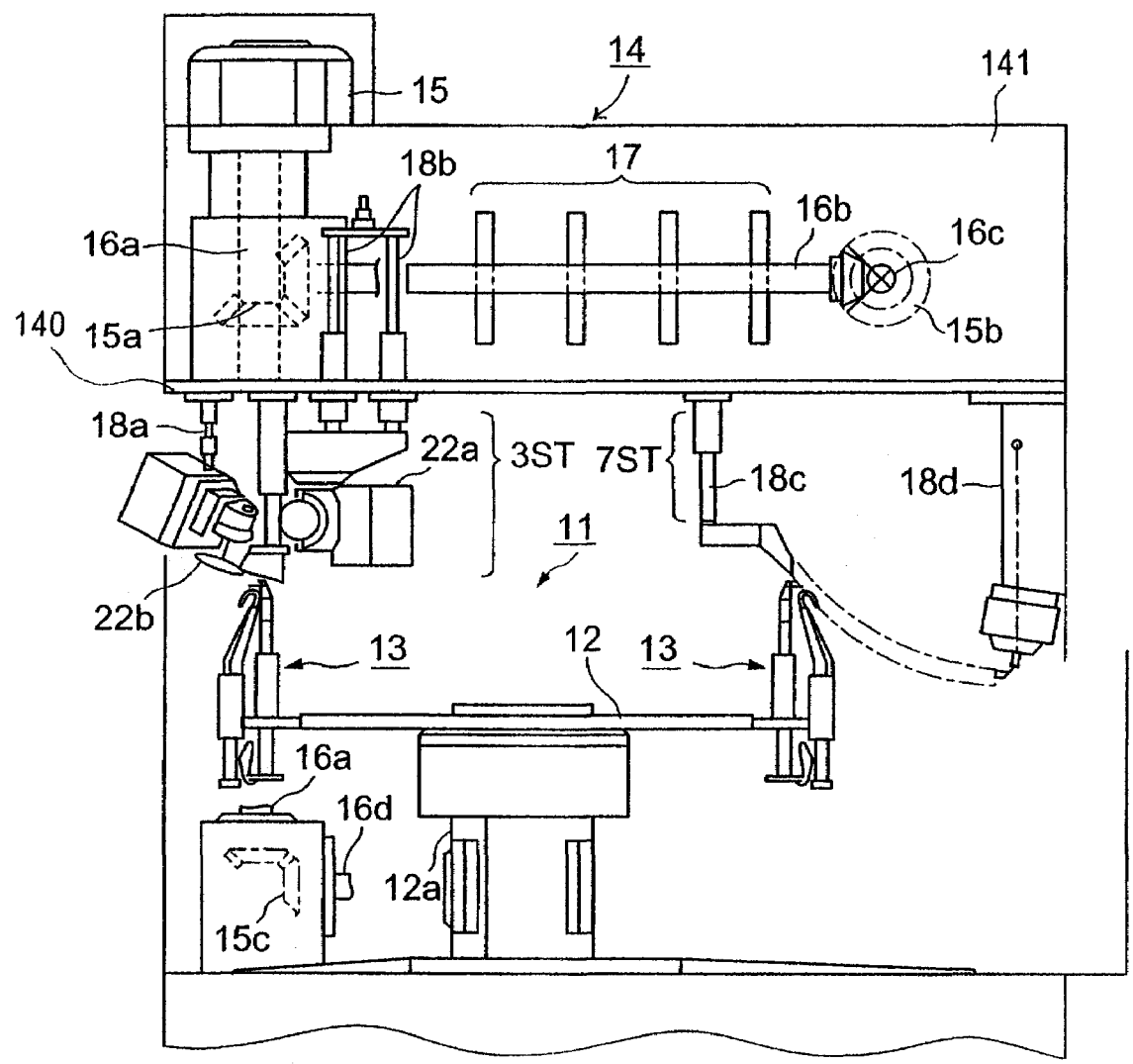
FIG. 3 illustrates a cross sectional view taken along line III-III of FIG. 4.
Figure 4:
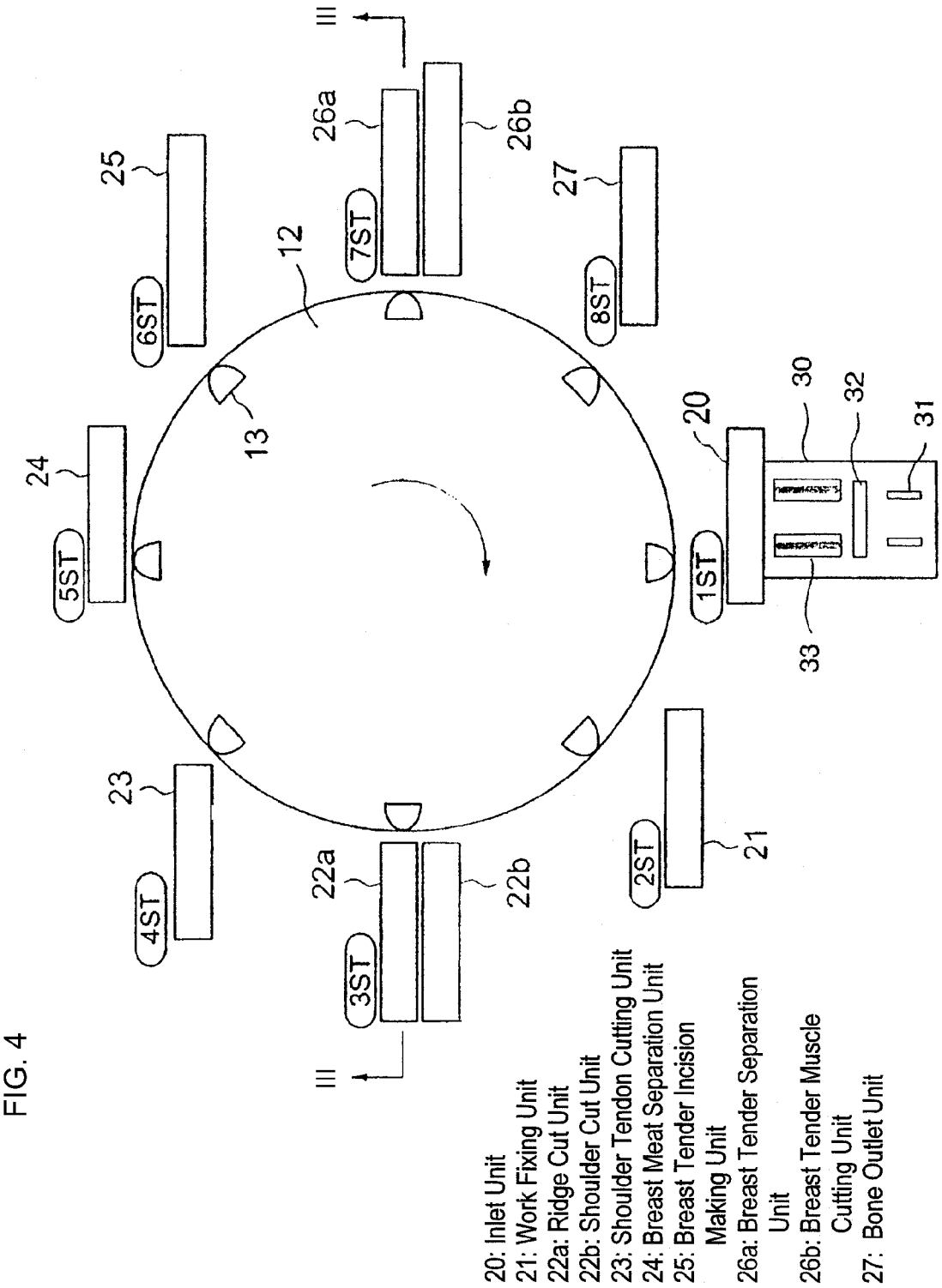
FIG. 4 schematically illustrates an assembly for processing poultry.

Next, a bone separating process of the slaughtered poultry as a pre-process step for the wing separation apparatus will be explained. As shown in FIGS. 3 and 4, an automatic bone separating apparatus for an upper body of poultry comprises a main tact transport process chamber 11, a group of eight stations 1ST-8ST, and a cam mechanism 14. The main tact transport process chamber 11 comprises a rotating disc 12 that is indexed to rotate every 45 degrees through an intermittent motion driving mechanism 12a, and eight cones 13 separated by 45 degrees and disposed along the circumference of the rotating disc 12. The stations 1ST-8ST for separating the bones comprises a pre-process unit (the skinning unit) 30 disposed in front of the work inlet (station 1ST), with the stations 1ST through 8ST spaced equally around the rotating disc 12. The stations 1ST through 8ST are disposed at the intermittent stopping positions of the rotating disc 12 to process the works fixed with the cones 13 on the rotating disc 12. The pre-process unit (skinning unit) 30 comprises a spine cut unit 31 for skinning, a lower surface skinning unit 32 for skinning the front breast meat, and a side skinning unit 33 for skinning the root of the wings (arm pits) left after skinning the lower surface.

The station 1ST has an inlet unit 20 for automatically placing the poultry processed by the side skinning unit 33 into the station 1ST (the moving body). The inlet unit 20 places the poultry in the cones 13. The station 2ST has a work fixing unit 21 that sets the work at a prescribed height. The station 3ST has a ridge cut unit 22a for cutting the back ridge of the fixed work and a shoulder cut unit 22b for cutting into the surface skin of the upper shoulder. The station 4ST has a shoulder tendon cutting unit 23 for cutting into between the shoulder joint 10 and upper arm bone head. The station 5ST has a breast meat separation unit 24 for separating the breast meat 1A from the wings 1B separated from the shoulder joint by cutting into the shoulder. The station 6ST has a breast tender incision making unit 25 for cutting into the thin film between the breast tender. The station 7ST has a breast tender separation unit 26a for chucking the upper end of the breast tender of which thin film is cut into and for separating the breast tender and a breast tender muscle cutting unit 26b. The station 8ST has a bone outlet unit 27. The work is intermittently moved in the main tact transport process unit 11. When the work is stopped as each of the stations for processing and the bone is exhausted from the final station. The present wing separating device can be incorporated in the above assembly.

As shown in FIG. 3, a vertical driving unit 16a extends from the lower portion of a speed reduction motor. Further, the vertical driving axis 16a is provided, from the vertical driving axis 16a, through a bevel gear 15a, a transverse driving axis 16b in a ceiling space 141. Further, the transverse driving axis 16b is provided, through a bevel bear 15b, with a longitudinal driving axis 16c. Further, the vertical driving axis 16a is provided, through a bevel gear 15c, a driving axis 16d in a lower process space 11. The driving axis 16d drives, through a conduct system (not shown), an intermittent driving unit 12a for the rotary disc 12.

Further, operation links 18a, 18b, 18c, 18d in the ceiling space 141 are introduced from a cam group 17 into the main tact transport process space 11. The operation links 18a and 18b are linked with a shoulder cut unit 22b and a ridge cut unit 22a in the station 3ST, respectively, while the operation links 18c and 18d are linked with the breast tender separation unit 26b in the station 7ST, thereby executing each process.

Figure 5A:
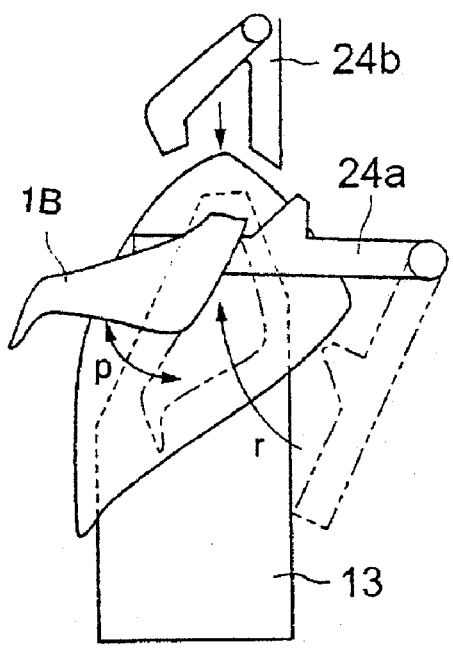
FIG. 5A illustrates a station 5ST of FIG. 4.
Figure 5B:
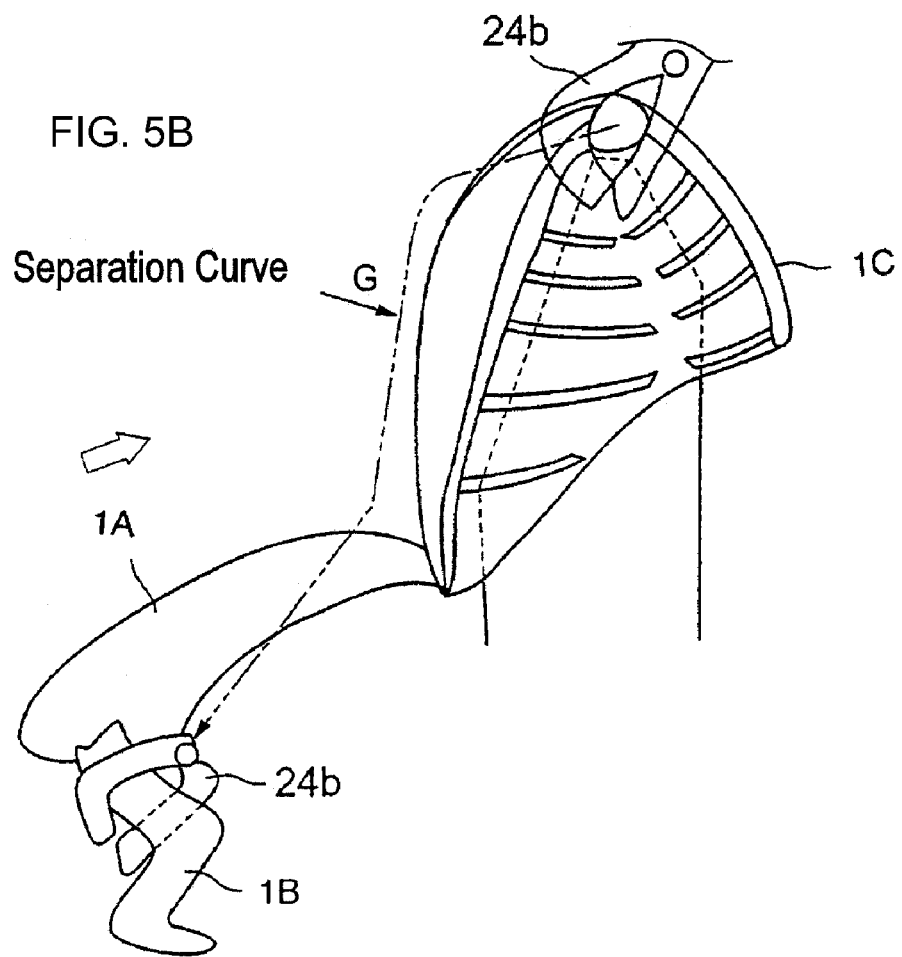
FIG. 5B illustrates the breast meat separation technique.

FIG. 5A is an outline of the breast meat separation unit 24 in the station 5ST shown in FIG. 4. FIG. 5B shows the breast meat separation, where the left and right wings 1B are pulled by the chuck, thereby separating the breast meat 1A together with the wings 1B from the body or breast bone 1C. As shown in FIG. 5A, the breast meat separation unit 24 comprises a pair of wing catchers 24a, 24a for catching the wings 1B by inclining them upward from the arm pits, and a pair of chucks 24b, 24b for chucking the wing roots where the gap is made in the arm pit per every catching-up process. The gap in the arm pit is made by inclining the arm pit along "p" direction by inclining the wing catcher 24a and then grasping the root of the wing by dropping the chuck 24b in a free state. The chuck 24b grasping the root of the wing by the cam mechanism descends along a separation curve G of a double dot line as shown in FIG. 5B, thereby separating the breast meat 1A with the wings 1B from the body 1C with a high yield.

Figure 6A:
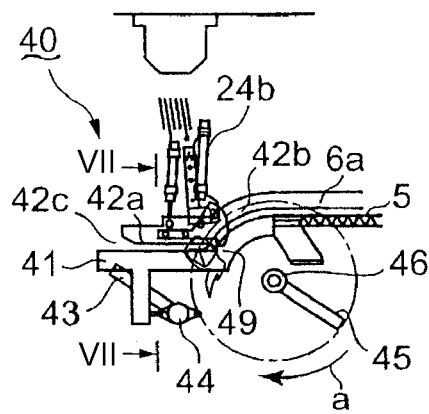
FIGS. 6A-6D illustrate elevational views showing the operational sequence of a delivering apparatus 40.
Figure 6B:
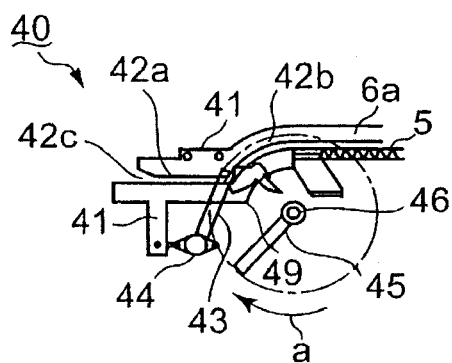
Figure 6C:
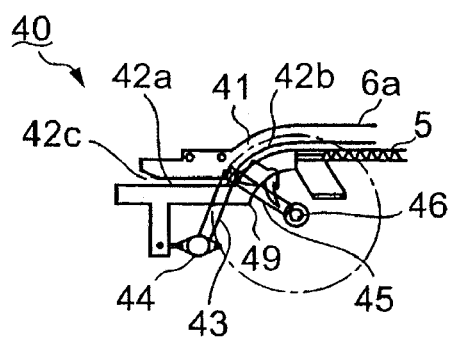
Figure 6D:
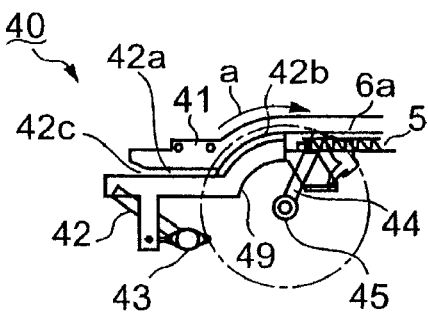
Figure 7:
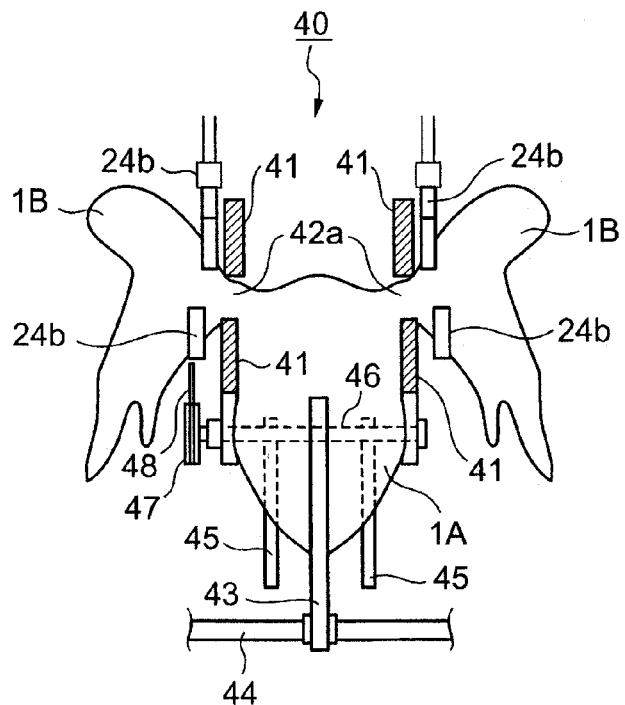
FIG. 7 is a cross-sectional view taken along line VII-VII of FIG. 6A.

Referring to FIGS. 6A-7, the delivering apparatus 40 for delivering the breast meat to the wing separation apparatus includes a pair of guide frames 41, 41 having an opening 42c for receiving the breast part 1 with the wings 1B carried by the chucks 24b. The breast part 1 is transported into the starting side of the shafts 5, 5 of the wing separation apparatus, through a pair of linear inlets 42a, 42a and arcuate inlets 42b, 42b. A push-in arm 43 disposed horizontally under the guide frames 41, 41 and fixed with a reversibly rotating shaft 44 pushes the breast part toward the shafts 5, 5. The roots of the wings 1B are grasped by the chucks 24b and are inserted from the opening 42c into the linear inlet 42a. Then, the push-in arm 43 pushes in the beast part 1 until it stops at a step portion 49 at the boundary between the linear inlet 42a and the arcuate inlet 42b. The rotation shaft 44 can be provided with an air cylinder (not shown) that can reversibly rotate the rotation shaft 44.

A pair of rotation arms 45, 45 are fixed to a rotation arm 46 provided between the pair of the guide frames 41, 41. Referring to FIG. 7, a wheel 47 rotatably driven by a belt 48 at one end of the rotation arm 46 rotates the rotation arms 45, 45 at a prescribed speed along "a" direction (FIGS. 6A-6D). The push-in arm 43 is positioned to avoid collision with the rotation arms 45, 45, which are linked with the cam mechanism 14 in the bone separation apparatus for the upper body of the poultry, thereby synchronizing with each apparatus in each process step.

Next, the operation of the first embodiment follows. In the pre-process step, the breast meat 1A, with the wings 1B maintained at the shoulder joint 10, is removed from the body 1C. In the breast meat separation unit 24, a pair of chucks 24b, 24b grasp the roots of the left and right wings 1B, and hold the wings upwardly with its left and right wings in the horizontal plane so that the breast part with the wings pass through the linear openings 42a, 42a in the guide frames 41, 41.

Then, the push-in arm 43 rotates through the opening 42c to push the breast part at the breast meat 1A through the linear inlets 42a, 42a until it is stopped at the step 49. Simultaneously, the chucks 24b release the breast part and returns to the bone separation apparatus. Then, the rotation arm 45 rotates and carries the breast part through the arcuate inlet 42b and pushes it out to the start side of the shafts 5, 5. Here, the guide frames 41, 41 of the delivering apparatus 40 can be unified with a frame that disposes the shafts 5, 5 and the guides 6, 6.

In the wing separation apparatus, the wings 1B are held upwardly with its left and right wings in the vertical plane or horizontal axis, which is perpendicular to the shafts 5, 5, and are introduced from the inlet guides 6a, 6a of the guides 6, 6 into the shafts 5, 5. The shoulder joint tissue (tendon) of the breast meat 1A directly under the shoulder joint is held between the shafts 5, 5 and the guides 6, 6. The breast part 1 is suspended at a direction vertical to the moving direction and is carried to the rotary blades 2, 2. During the carrying process (rotation of the shafts 5, 5), the wings 1B do not freely rotate in relation to the beast meat 1A, i.e., its posture is limited, because the guides 7, 7 spread out the wing tips 1Bb, 1Bb.

The breast part 1 is supported at the arm pits of the shoulder joints 10 by the left and right shafts 5, 5 with the left and right wings aligned perpendicular to the moving direction of the breast part 1. That is, the wings are on a plane or an axis that is substantially perpendicular to the moving direction or the axes of the shafts 5, 5. The tendons of the breast meat 1A are pushed to the lower corner portion of the guides 6, 6, thereby positioning the breast part 1 by utilizing the gradually increasing pressure by the slant configuration of the guides 6, 6. The tendons inside the shoulder joints 10 are cut by the rotary blades that intrude into the recesses 6b, 6b of the guides 6, 6, thereby separating the breast meat 1A from the wings 1B. After the separation, the breast meat supported at the two points by the guides 6, 6 and shafts 5, 5 is transferred to a post-process step.

Figure 8:
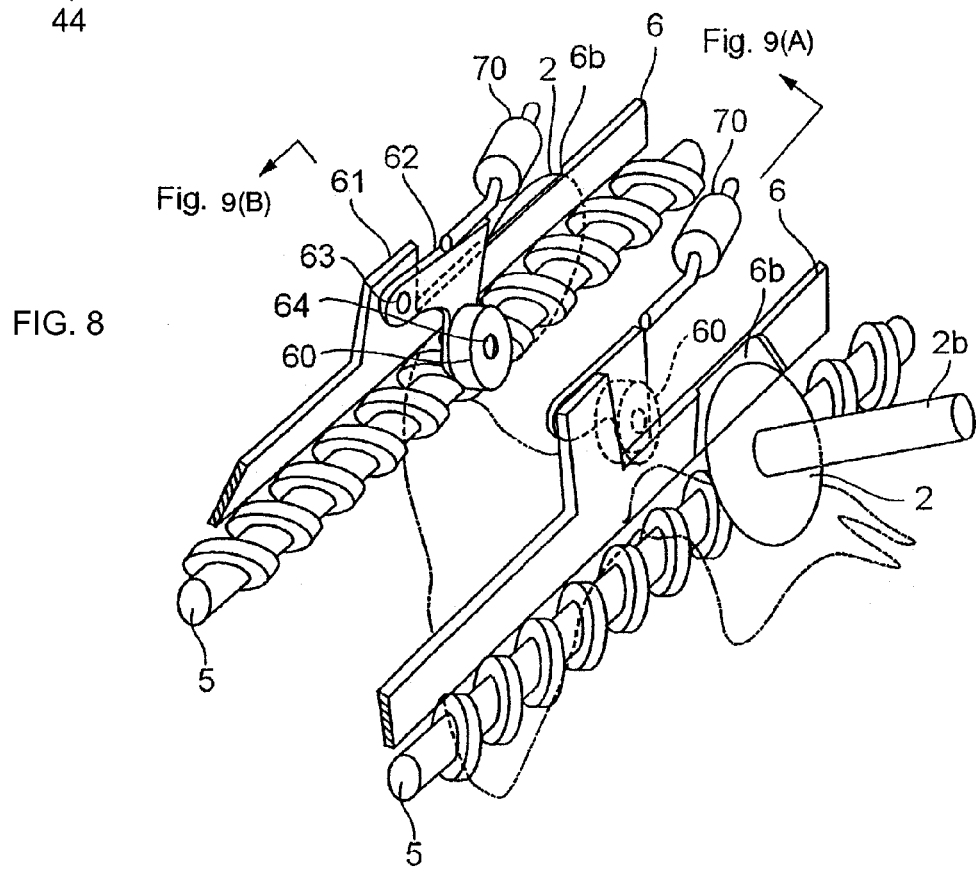
FIG. 8 illustrates a perspective view of a principal part of a second embodiment of the wing separating apparatus.
Figure 9A:
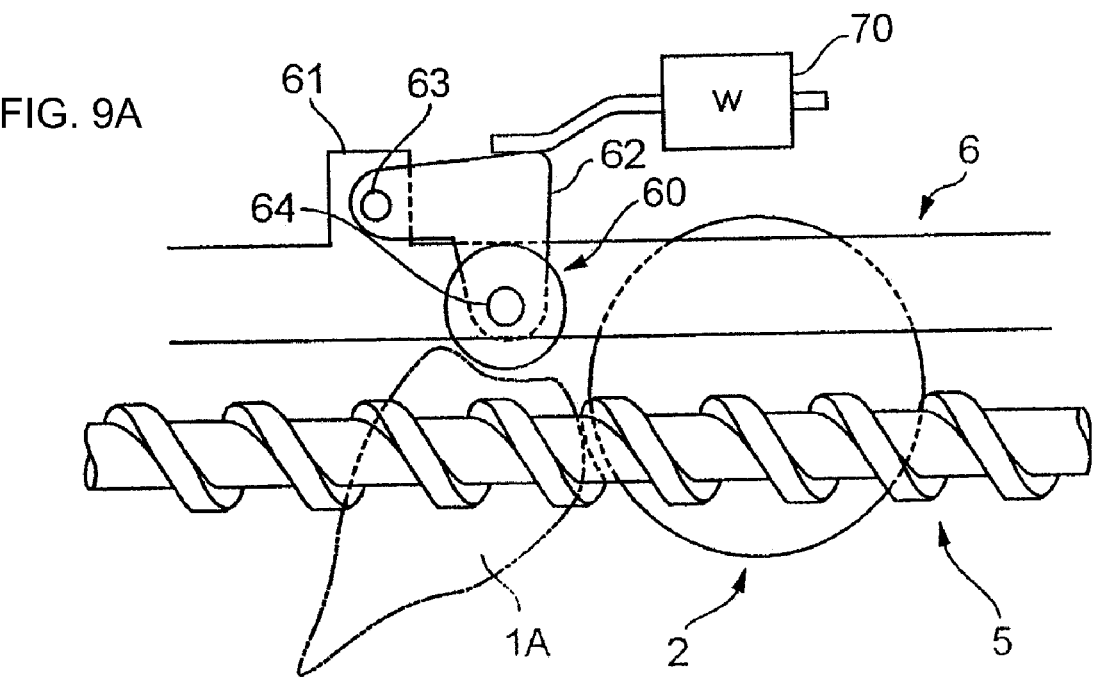
FIG. 9A illustrates a side view of the wing separating apparatus of FIG. 8.
Figure 9B:
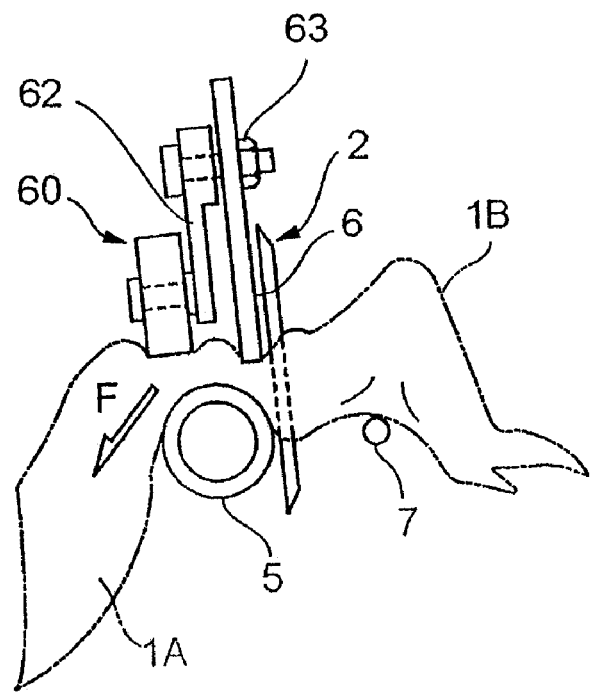
FIG. 9B illustrates a partial end view of the wing separation apparatus of FIG. 8 near the rotary blade.
Figure 10:
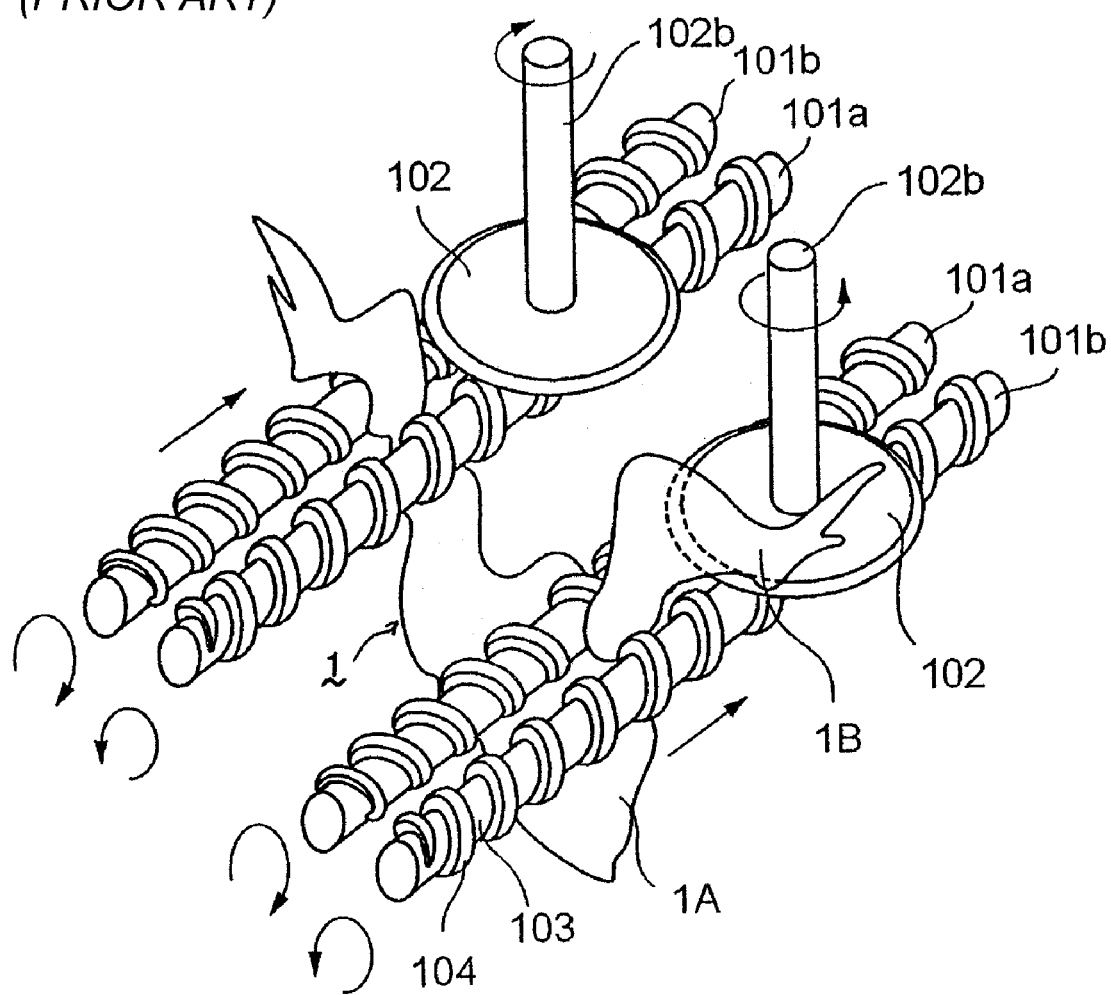
FIG. 10 illustrates a perspective view of a conventional apparatus for separating the left and right wings from the breast part of poultry.
Figure 11A:
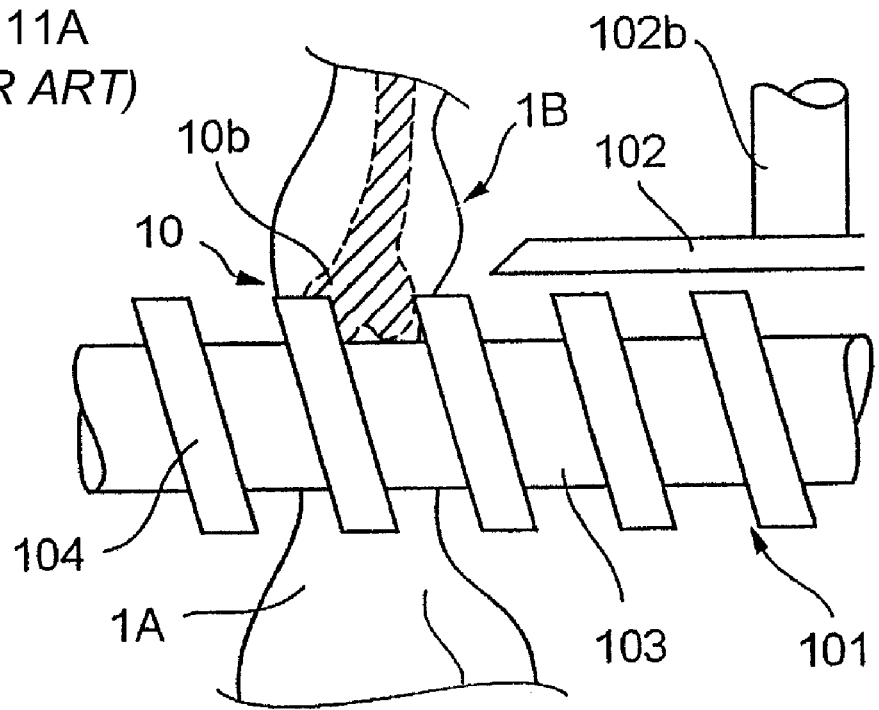
FIG. 11A illustrates an enlarged side view of FIG. 10 near the rotary cutting blades.
Figure 11B:
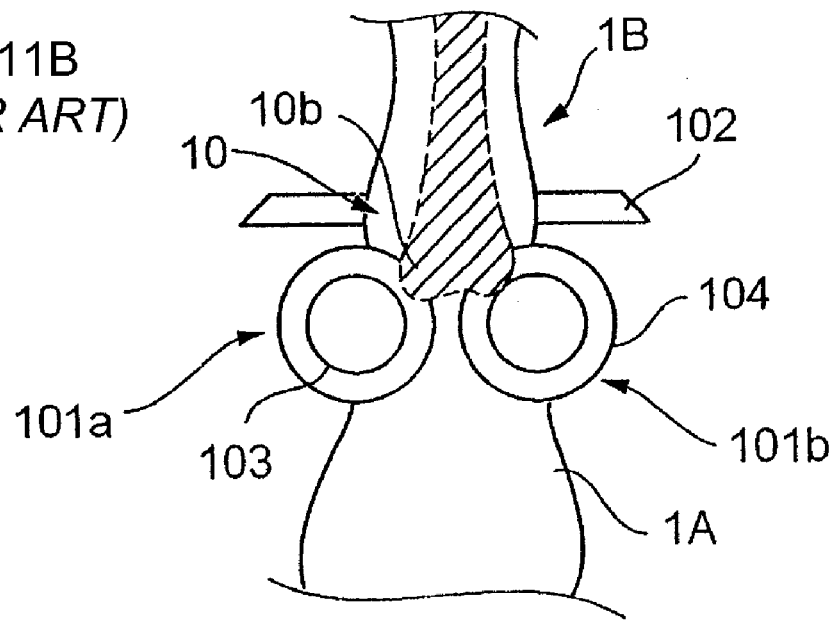
FIG. 11B illustrates an enlarged end view of FIG. 10 showing the rotary cutting blades relative to the joint 10 of the wing connecting to the breast meat.

Referring to FIGS. 8-9B, the second embodiment of the wing separating device is similar to the first embodiment in that it also includes the shafts 5, 5, the guides 6, 6, the guides 7, 7, and the rotary blades 2, 2 substantially as set forth in the first embodiment. The guide 7, 7 are not shown in these figures. In the second embodiment, in front of the rotary blades 2, 2, a pair of meat pressing members, which can be rollers 60, 60, for applying pressure to the breast meat 1A toward the shafts 5, 5 with weights 70, 70 (or alternatively with springs (not shown)) are disposed at the inner sides of the guides 6, 6. Moreover, the upper edge of each of the guides 6, 6 has an extension so that the guide forms an inverted "T" shape upstream of the recess 6b relative to the shaft 5. At an inner side of each guide 6, at the projected portion of the "T" shape 61, a support arm 62 having an inverse "L" shape is rotatably mounted thereto so that the support arm 62 can pivot and fluctuate along an approaching direction or separating direction to and from the respective shaft 5 and over the shaft 5. The weight 70 can be fixed on an upper portion of each support arm 62, while the roller 60 is rotatably supported on a rotation shaft 64 that is mounted to a lower portion of each support arm. The rollers 60 press the upper surfaces of the breast meat 1A positioned inside and over the shafts 5, 5.

The guides 6, 6 also include the bent inlet guides 6a, 6a identical to the first embodiment. However, in the second embodiment, the guides 6, 6 are not slanted like in the first embodiment. That is, the gap between the lower portions of the guides 6, 6 are not gradually widening toward the downward stream direction. Instead, the guides 6, 6 extend substantially parallel with the shafts 5, 5. According to the above-mentioned construction, the breast meat is more intensely rolled in the shafts 5, 5 by the pressure of the rollers 60, thereby separating the breast meat from the rotary blades and minimizing the quantity of the breast meat left at the shoulder joint of the cut wings.

The second embodiment can automatically process the breast meat regardless of the size of the poultry, because the roller together with the weight exerts pressure to the breast meat. The support arms 62, 62 freely fluctuate, thereby having a degree of freedom along the upward and downward directions in accordance with the thickness of the breast meat. Further, the guides 6, 6 can be slanted inwardly toward the inner direction at least at the position of the rotary blade 2, 2 and moreover have recesses 6b, 6b at the outer sides of the guides 6, 6, so that the rotary blade 2, 2 can intrude into the guides 6, 6 as in the first embodiment. Further, similarly to the first embodiment, the guides 6, 6 can be slanted toward the inner sides, along their entire length or only at the rotary blade position as described above.

The apparatus according to the present invention can fix the posture of the wings in relation to the breast meat. That is, as the guides are fixed, the breast part slides on the guides. Therefore, the wings do not rotate in relation to the breast meat and the shoulder joint is not pulled into the rotating shafts.

As the guides are slanted toward the inner center between the shaft guides toward the downstream of the shafts, i.e., the distance between the guides and the respective shafts becomes smaller as the breast part approaches the rotary blade. The rotary blade thus can touch the breast meat secured between the shafts and the guides. Thus, the apparatus according to the present invention can operate with a wide range of poultry sizes, even when the guides are elastically deformed. Therefore, there is no need for finely adjusting the distance between the guides and the respective shafts, thereby simplifying the apparatus operation.

Further, due to the slanted guides and the recesses formed thereon, the gap between the guides and the respective rotary blades becomes narrow. Thus, the wings are surely cut off and separated from the breast meat.

Further, as the guides can be elastic, the joint bone of large poultry is not damaged and precisely positioned. Accordingly, cutting of the bone of the upper shoulder joint of the wing root is avoided, even when the position error between the rotary blade and the support point of the guide occurs. Further, the bone of the upper shoulder joint of the wing root is not erroneously cut, because the rotary blade smoothly intrudes the joint tissue (tendon) of shoulder joint. Therefore, the products of substandard quality can be greatly reduced. Further, due to the recesses formed at the guides, the rotary blades come very close to the support position of the guides. Therefore, the bone of the shoulder joint is hardly cut.

As the corner of the guides having a board configuration stably holds the skin, the skin does not escape to the groove of the helical threading, when it is cut. Therefore, the wings are completely cut from the breast meat, even when the rotary blade is not sharp. Further, according to the pressuring unit (for example, the roller or sleigh) directly in front of the rotary blade for applying pressure to the breast meat against the shaft, the breast meat is separated from the rotary blade. The present apparatus thus can minimize cutting of the breast meat at the shoulder joint as the wings are cut off.

Further, the poultry can be automatically processed despite the size variations because the pressuring unit (the roller or sleigh) has a degree of freedom along the direction approaching or separating to or from the upper surface of the shaft, in response to the thickness of the breast meat. Further, the pressuring unit (roller, sleigh) allows the wings to be stably separated from the breast meat, although the operator might possibly cut off the breast meat left around the wing, particularly in accordance with the regulation governing the poultry industry.

According to the present wing separating apparatus and method thereof for the poultry, the tolerance of the size of the poultry (variation of the radius of the joint) is wide, thereby reducing rejected products that would have been generated, for example, by cutting the bone at the root of the wing at the upper end of the shoulder joint.

It should be understood that the present invention is not to be limited to specifically described sizes, materials and relative arrangements and so on regarding the constituent components illustrated in the drawings. While the present invention has been particularly shown and described with reference to preferred embodiments thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

What is claimed is:

1. An apparatus for separating left and right wings from a breast part of poultry, the apparatus comprising:
   left and right shafts for supporting the breast part from left and right arm pits thereof, with the left and right wings positioned substantially aligned perpendicular to a moving direction of the breast part, which is moved by rotating the shafts;
   left and right first guides extending along and above the shafts for positioning left and right tendons at the arm pits for cutting; and
   left and right rotary blades disposed adjacent to outer sides of the guides,
   wherein the breast part is moved toward the rotary blades by rotating the shafts, and
   wherein the rotary blades cut the tendons to separate the wings from a breast meat thereof as the breast part is conveyed by the shafts toward the blades.

2. The apparatus according to claim 1, wherein:
   the guides are positioned spaced from the shafts with the spacing therebetween gradually becoming narrower along the moving direction of the breast part; and
   the guides are slanted toward an inner center between the shafts.

3. The apparatus according to claim 2, further comprising a pushing force device for pushing the breast meat toward the shafts immediately upstream of the rotary blades.

4. The apparatus according to claim 3, wherein the pushing force device comprises:
   left and right rotating support arms rotatively mounted respectively to the left and right guides;
   left and right pressure applying devices disposed respectively on the left and right support arms for applying pressure to the left and right rotating support arms; and
   left and right breast meat pressing members mounted to the left and right rotating support arms for pressing the breast meat.

5. The apparatus according to claim 4, wherein:
   the pressure applying devices are weights, and
   the meat pressing members are rollers.

6. The apparatus according to claim 1, wherein:
   portions of the guides, at least at a position adjacent to the rotary blades, are slanted toward an inner center between the shafts,
   an outer side of each of the guides has a recess for receiving the respective rotary blade, and
   the rotary blades are disposed parallel to the respective outer side of the guides.

7. The apparatus according to claim 1, further comprising left and right second guides disposed substantially parallel to and laterally outwardly of the shafts, wherein portions of the second guides are bent toward outer sides adjacent to the blades to avoid interference with the rotary blades.

8. The apparatus according to claim 1, further comprising a pushing force device for pushing the breast meat toward the shafts immediately upstream of the rotary blades.

9. The apparatus according to claim 8, wherein the pushing force device comprises:
   left and right rotating support arms rotatively mounted respectively to the left and right guides;
   left and right pressure applying devices disposed respectively on the left and right support arms for applying pressure to the left and right rotating support arms; and
   left and right breast meat pressing members mounted to the left and right rotating support arms for pressing the breast meat.

10. The apparatus according to claim 9, wherein:
    the pressure applying devices are weights, and
    the meat pressing members are rollers.

11. The apparatus according to claim 1, further comprising a delivering apparatus for delivering the breast part onto the shafts, the delivering apparatus comprising:
    left and right guide frames having left and right guide openings for receiving and guiding the breast part toward the shafts; and
    a pushing device for pushing the breast part toward the shafts and onto the shafts.

12. The apparatus according to claim 11, wherein:
    each of the guide openings includes a linear guide route and an arcuate guide route extending downstream from the linear guide route,
    a stop formed between the linear guide route and the arcuate guide route for stopping the breast part, and
    the pushing device comprises a pushing arm for pushing the breast part along the linear guide route to the stop and left and right rotating arms for pushing the breast part located at the stop through the arcuate guide route and onto the shafts.

13. A method of separating left and right wings from a breast part of poultry, the method comprising the steps of:

supporting the breast part from left and right arm pits thereof on left and right shafts, with the left and right wings positioned substantially aligned perpendicular to a moving direction of the breast part, which is moved by rotating the shafts;

positioning left and right tendons at the arm pits for cutting with left and right first guides extending along and above the shafts;

moving the breast part with the wings along the shafts toward left and right rotary blades disposed adjacent to the guides by rotating the shafts; and cutting the tendons with the rotary blades while the breast part is moved along the shafts to separate the wings from a breast meat thereof.

14. The method according to claim 13, wherein:

the guides are positioned spaced from the shafts with the spacing therebetween gradually becoming narrower along the moving direction of the breast part; and the tendons are positioned for cutting by pushing the guides toward the tendons.

15. The method according to claim 14, wherein the breast meat is pushed with a pushing force device to apply pushing forces toward the shafts immediately upstream of the rotary blades.

16. The method according to claim 15, wherein the pushing forces are generated by gravity forces that allows fluctuation upwardly away from or downwardly toward upper surfaces of the shafts, which have helical grooves.

17. The method according to claim 13, wherein:

the guides are slanted toward inner center between the shafts; and an outer side of each of the guides has a recess for receiving the respective rotary blade.

18. The method according to claim 13, wherein:

portions of the guides, at least at a position adjacent to the rotary blades, are slanted toward an inner center between the shafts, and an outer side of each of the guides has a recess for receiving the respective rotary blade.

19. The method according to claim 13, wherein the breast meat is pushed with a pushing force device to apply pushing forces toward the shafts immediately upstream of the rotary blades.

20. The method according to claim 19, wherein the pushing forces are generated by gravity forces that allows fluctuation upwardly away from or downwardly toward upper surfaces of the shafts, which have helical grooves.

21. The method according to claim 13, further comprising the steps of:

grasping the breast part with the wings spread out from the breast meat with a grasping apparatus;

delivering the breast part to a delivering apparatus while the breast part is grasped by the grasping apparatus; and introducing the breast part onto the shafts with the delivering apparatus.

* * * * *